United States Patent
Li et al.

(10) Patent No.: US 7,954,091 B2
(45) Date of Patent: May 31, 2011

(54) METHOD AND APPARATUS FOR TESTING OF BUSINESS PROCESSES FOR WEB SERVICES

(75) Inventors: Zhong Jie Li, Beijing (CN); Bin Du, Beijing (CN); Wei Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1131 days.

(21) Appl. No.: 11/710,121

(22) Filed: Feb. 23, 2007

(65) Prior Publication Data

US 2007/0277158 A1    Nov. 29, 2007

(30) Foreign Application Priority Data

Feb. 24, 2006  (CN) .......................... 2006 1 0051446

(51) Int. Cl.
*G06F 9/44* (2006.01)
*G06F 15/177* (2006.01)
*G06F 9/45* (2006.01)

(52) U.S. Cl. ............. 717/135; 717/126; 703/22; 714/35

(58) Field of Classification Search .................... 717/135
See application file for complete search history.

(56) References Cited

U.S. PATENT DOCUMENTS

| | | | |
|---|---|---|---|
| 6,668,370 B1 * | 12/2003 | Harmon et al. | 717/125 |
| 7,149,679 B2 * | 12/2006 | Woodring | 703/22 |
| 7,194,733 B2 * | 3/2007 | Ringseth et al. | 717/136 |
| 7,607,128 B2 * | 10/2009 | Arthurs et al. | 718/1 |
| 7,725,590 B2 * | 5/2010 | Sedukhin | 709/230 |
| 7,836,436 B2 * | 11/2010 | Ringseth et al. | 717/136 |
| 2004/0064806 A1 | 4/2004 | Johnson | |
| 2004/0103396 A1 * | 5/2004 | Nehab | 717/127 |
| 2005/0216890 A1 * | 9/2005 | Sundararajan et al. | 717/120 |
| 2006/0190926 A1 * | 8/2006 | Bennett et al. | 717/114 |

FOREIGN PATENT DOCUMENTS

| | | |
|---|---|---|
| WO | WO0293367 | 6/2004 |
| WO | WO2005082072 | 9/2005 |

OTHER PUBLICATIONS

Bai et al., "WSDL-Based Automatic Test Case Generation for Web Services Testing"; IEEE, 2005; 7pg.*
Jai et al., "Rigorous and Automatic Testing of Web Applications"; Conference on Software Engineering and Applications, 2002, 6pg.*
Tsai et al., "Specification-Based Verification and Validation of Web Services and Service-Oriented Operating Systems"; IEEE, 2005, 9pg.*
Yang, et al., "Constructing an object-oriented architecture for Web application testing"; Journal of Information Science and Engineering, Jan. 2002; p. 59-84.*

* cited by examiner

*Primary Examiner* — Wei Y Zhen
*Assistant Examiner* — Ryan D Coyer
(74) *Attorney, Agent, or Firm* — William Stock; Anne Vachon Dougherty

(57) ABSTRACT

A method for unit testing of business processes for Web services, including steps of mapping the Web service description language (WSDL) elements of a process under test and its partner processes into equivalent Object-Oriented language (OO) elements, and performing testing on the process under test based on Object-Oriented unit testing frameworks. Each Web service interface of the process under test and its partner processes is mapped into an equivalent OO interface, partner stubs are generated on basis of the OO interfaces of the partner processes, WSDL binding and service port information are defined for the generated partner stubs, test cases are formed which contain test logic describing the service invocations between the process under test and its partner processes, and the test cases are executed, wherein the partner stub and its associated mock object collectively implement the service of a corresponding partner process.

15 Claims, 8 Drawing Sheets

Fgi. 3

METHOD AND APPARATUS FOR TESTING OF BUSINESS PROCESSES FOR WEB SERVICES

TECHNICAL FIELD

The present invention relates to the testing of computer programs, and more particularly, to a method and apparatus for unit testing of automatic business processes specified in business process programming languages for Web services.

BACKGROUND ART

Over the last decade, businesses and governments have been giving increasing attention to the description, automation, and management of business processes using IT technologies. The business process is the basic unit of business value within an organization.

The Business Process Execution Language for Web Services (BPEL4WS, abbr. BPEL) is an example of business process programming language for web service composition. Other languages include: BPMN, WfXML, XPDL, XLANG, WSFL, etc. These languages all describe a business process by composing web services. Generally speaking, a business process is defined in terms of its interactions with partner processes (PP). A partner process may provide services to the process, require services from the process, or participate in a two-way interaction with the process.

Mission-critical business solutions need comprehensive testing to ensure that they perform correctly and reliably. A common strategy is to subject the solution to several phases of testing such as unit, integration and system testing. Unit testing verifies the functions of a single module (class, component, process, etc). Integration testing verifies the joint functions of several modules. System testing tests the whole solution as a black-box by navigating the user interfaces (if any exist). System testing is common because it is almost the last defense for detecting fatal bugs before product release and is mandatory in traditional software development. Often the later a bug is discovered, the more expensive it is to fix. On the other hand, unit testing could be automated to make regression testing practical and efficient, which ensures newly-added functions will not affect old parts and helps control quality risks. Therefore, software engineering practice has been recently laying more emphasis on unit testing. JUnit is the most famous embodiment of this trend. Based on JUnit and its principle, many unit testing frameworks and tools have been proposed and implemented for Java, EJB, Servlet, Net, and other types of programming techniques. Unit testing tools are becoming an indispensable part of an Integrated Development Environment (IDE) and are welcomed by developers as means to improve productivity and quality.

Business process unit testing treats an individual process as the unit under test, and tests its internal logic thoroughly by isolating it from the partner processes. The reason why partner processes are simulated rather than using real partner processes lies in the following facts: 1) during the unit testing phase, some of the dependent partner processes are still under development and are thus unavailable. 2) some partner processes are developed, possibly in a totally different development environment, and are governed by other enterprises, such that the developer cannot obtain the partner processes' source code as well as related software modules to set up the running environment for the testing. 3) even with the partner processes ready for use, simulated ones are still preferred because they could generate more interaction scenarios with less effort, because answers to the process under test are faked instead of calculated according to real business logic—calling other business processes, accessing databases or interacting with humans.

In current industrial practice, business process testing focuses on system testing, e.g., the Rational Functional Tester of IBM, while unit testing has not gained any attention. The lack of a business process unit testing method and tool has resulted in the following drawbacks: 1) Processes are seldom tested in isolation, because they are inter-dependent—so it is difficult to run one process while its partner processes are not ready. 2) In the rare case of testing a process in isolation by simulating its partner processes, the partner processes are written in an ad-hoc, subjective and incomplete manner; such that services must be re-bound and redeployed and the server must be restarted for different test purposes/test cases (which are time-consuming tasks); and distributing test logic into multiple processes doesn't favor easy test maintenance and usage. 3) Test execution is performed manually without any tooling support, which does not facilitate automatic regression testing.

Current unit testing frameworks are designed for Object-Oriented (OO) programming languages, and cannot be used directly in testing business processes, which are procedure-oriented with no class concept. In addition, concurrency and synchronization are basic test requirements of business processes but haven't been supported in current frameworks. The current frameworks need to be adapted and extended to make business process unit testing possible.

Although the above-mentioned business processes programming languages are web service choreography languages, web service testing, e.g., methods and tools such as WebService Tester of Optimyz and SOAPtest of Parasoft, are not applicable to business process unit testing in general. Web service testing treats the unit under test as a black-box, only its interface definition needs to be used, with no concern with its internal implementation. In web service testing, a test case simulates the client, sends a request message and checks the response message. In business process testing, however, such a simple message exchange between the test case and the unit under test is not sufficient. Business process unit testing treats the unit under test as a white-box and the internal implementation logic needs to be used. A business process generally has many partners, with which it interacts many times according to the business logic. To test such a process, all these partners must be simulated and a complete test logic must be applied that could specify generic, complex interaction between processes. Therefore, a business process unit test case will be more complex, usually consisting of many simulated partner processes of the process under test.

SUMMARY OF THE INVENTION

The object of the present invention is to overcome the disadvantages in the prior art and to provide a method for unit testing of business processes specified in business process programming languages for Web services in a standardized, unified and efficient way.

Another object of the present invention is to simplify test case writing in the unit testing of business processes for Web services.

Yet another object of the present invention is to provide an apparatus and a computer program product for unit testing of business processes for Web services.

In order to achieve the above objects, according to one aspect of the present invention, a method for unit testing of business processes for Web services comprises the steps of mapping the Web service description language (WSDL) elements of a process under test and its partner processes into equivalent Object-Oriented language (OO) elements; and performing test on the process under test based on Object-Oriented unit testing frameworks.

In the mapping step of the above method, each Web service interface of the process under test and its partner processes is mapped into an equivalent OO interface; and the step of performing testing based on Object-Oriented unit testing frameworks includes: generating partner stubs based on the OO interfaces of the partner processes obtained in said mapping step; defining WSDL binding and service port information for the generated partner stubs; forming test cases containing test logic which describes the service invocations between the process under test and its partner processes, wherein the mock objects of the OO interfaces of the partner processes are used to simulate the services of the partner processes; and executing the test cases, wherein each partner stub and its associated mock object collectively implement the service of a corresponding partner process.

In the step of forming test cases in above method, the service invocation from the partner process to the process under test may be implemented by a service proxy invoking the mock object of the process under test.

In the step of forming test cases in above method, a skeleton of each said test case may be generated automatically, and each said test case may be completed based on the skeleton. In addition, the step of forming test cases can be performed graphically.

According to another aspect of the present invention, an apparatus for unit testing of business processes for Web services comprises means for mapping the Web service description language (WSDL) elements of a process under test and its partner processes into equivalent Object-Oriented language (OO) elements; and means for performing test on the process under test based on Object-Oriented unit testing frameworks.

According to yet another aspect of the present invention, there are provided a computer program and the storage medium thereof, the computer program containing codes for performing the above method.

The present invention has the following advantages in business process unit testing.

1) Enables automatic regression testing. Process testing is automated by encapsulating all the required test logic and data in unit test cases. Each time the process under test is modified, its test cases can be re-run (after possible modification) to detect potential function break due to modification. In this way, business process refactoring is facilitated.

2) Does not rely on the availability of partner processes. This method provides an easy way of simulating the partner processes without knowing their internal business logic. Thus a single process can be easily tested in isolation.

3) Simplifies test case writing. Most developers are familiar with one of the popular unit testing frameworks and the associated OO programming languages. This method allows process interaction to be programmed in OO flavor. Using this method, developers will no longer be concerned with XML document manipulation, interface, binding and service details in testing. For those business process programmers who are unfamiliar with the selected OO language of the testing tool, a visual test case editor could help them to overcome the obstacle.

4) Speeds up test execution. Specifically, this method allows "one-deploy, multiple tests". The process under test is deployed only once to run all the test cases associated with this process. This is compared to those methods using stub processes to simulate the partner processes, in which any modification of the stub processes mandates the process redeployment and server restart.

BRIEF DESCRIPTION OF THE DRAWINGS

From the following description of the preferred embodiments of the present invention in conjunction with the accompanying drawings, further objects, features and advantages of the present invention will be more apparent to those skilled in the art. In the drawings.

DETAILED DESCRIPTION OF THE INVENTION

In the present application, the BPEL process is used as an example to describe the present invention. However, those skill in the art will appreciate that the example is for purpose of illustration only and not for limitation. The present application can also be applied to unit testing of the business process in other business process programming languages for Web services.

Figure 1:
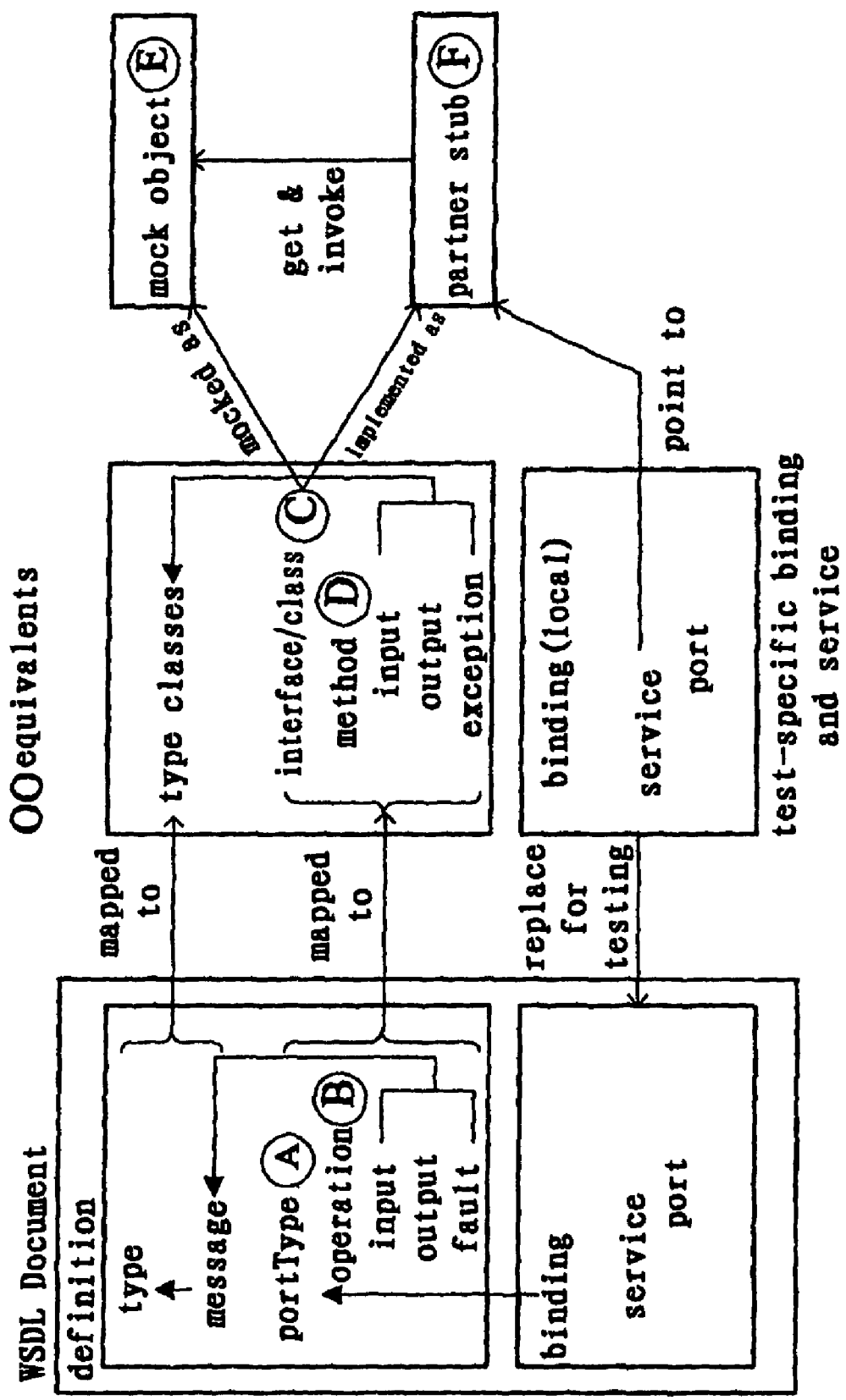
FIG. 1 depicts the relationship between the WSDL description and the Object-Oriented (OO) language description of the business process in the business process unit testing method according to the present invention.

Web service interfaces that are provided by the business processes are described in Web Service Description Language (WSDL) files and optionally XSD files. FIG. 1 shows the structure of a typical WSDL file. The WSDL files contain types, message, portType, binding and service elements. The "portType" groups a set of operations that can be invoked by a service requester, "types" and "message" definitions provide the data model of the operation. "Binding" gives protocol and data format specification for a particular portType, and "service" declares the addressing information associated with defined bindings.

The present invention is centered around the following idea: transform process interaction using web service invocations to class collaboration using method calls, and then apply Object-Oriented testing techniques in the business process domain.

Figure 2:
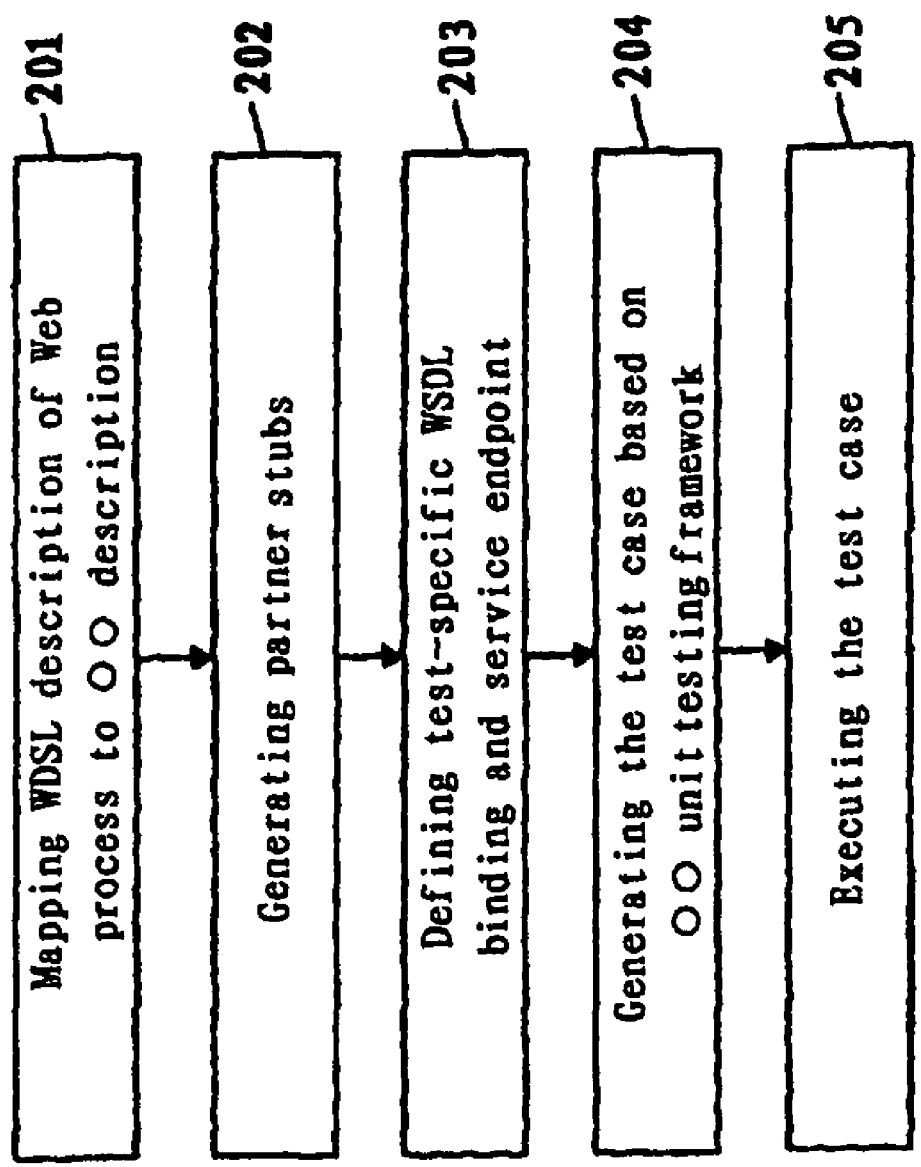
FIG. 2 is a flowchart depicting the business process unit testing method according to the present invention.

FIG. 2 is a flowchart depicting the business process unit testing method 20 according to a preferred embodiment of the present invention.

The method 20 starts at step 201. In this step, the key WSDL elements of the process under test (PUT) and its partner processes are mapped to Object-Oriented (OO) language equivalents. The purpose of this step is to map each Web service interface definition of the involved processes to an equivalent OO representation. The mapping consists of two parts: Web service interface (denoted as A in FIG. 1) maps to OO interface/class (denoted as C in FIG. 1); and Web service types and messages map to OO data type classes. The OO data type classes will be used to define test data in an OO test program. The OO interface/class will be used to generate an OO mock object (denoted as E in FIG. 1) of the interface/class, which will be discussed later. Each WSDL operation (denoted as B in FIG. 1) will have a corresponding OO method (denoted as D in FIG. 1) contained in a proper OO interface/class (C). The operation "input" in WSDL corresponds to the "input" in OO method, the operation "output" in WSDL corresponds to the "output" in OO method, and the operation "fault" in WSDL corresponds to the "exception" in OO method.

Next, in step 202, partner stubs are generated based on the OO interface/class (C) as shown in FIG. 1. A partner stub class (denoted as F in FIG. 1) implements/inherits an interface/class (C) derived in step 201. Specifically, the partner stub dynamically gets the mock object (E) that simulates the service and calls the mock object's corresponding method (D), collects the return value (if not void) and returns that value. In this way, the partner stub is essentially a simple wrapper of the real service provider implementation in mock (E). The exact behavior of the mock objects can be defined dynamically in test cases, which will be described in more detail hereinafter. The partner stubs are stateless and independent of test behaviors, and they can be automatically generated based on the interfaces/classes (C) derived in step 201. The address of the partner stubs will be referenced in the corresponding WSDL service definition so that the invocation of a web service operation (B) will go to the correct method (D) of a correct partner stub (F). In this way, a partner stub and its associated mock object collectively implement a simulated partner process. The partner stub implements a simple relaying logic and is the static part that is generated before test execution, while the mock object will define the test logic and is the dynamic part that will be created during test execution. This is different from the current use of stub processes in that stub processes contain the real test logic, and are connected to the process under test directly, so that one must write and maintain a lot of stub processes, and redeploy and restart the processes for each test scenario. In the present invention, via the split of responsibilities onto a partner stub and a mock object, one realizes the benefit of a single partner stub and dynamic changing of test logic without redeploying and restarting.

Next, in step 203, test-specific WSDL binding and service endpoints are defined. The original WSDL binding and service endpoints of the partner processes may be varied: SOAP, JMS, EJB, etc. For unit testing, all the partner processes will be simulated as local services. Thus, a more efficient binding is chosen. Local OO language binding, e.g., Java binding (WSIF, Web Service Invocation Framework) is preferred, provided that the development environment supports such bindings. If there is no such support, an alternative binding, e.g. SOAP binding can be used. As such, the WSDL service definition should set its endpoint to the address of a proper partner stub (F).

Next, in step 204, test cases are formed based on an Object-Oriented unit testing framework. A test case (or, a test method within a test case) defines an execution path of the process under test and contains all the test logic to implement a specific test purpose. Test logic may be written manually. In a preferred embodiment, test logic can be generated semi-automatically. Specifically, a skeleton of the test case can be generated by a test generator first, and then the writing of the test case is completed. In order to test a business process completely, two capabilities, detailed below as a) and b), are indispensable in test logic representation. This invention does not limit how to implement such capabilities. However, this invention provides a preferable implementation for each capability.

a) The test logic representation should be able to describe both directions of service invocations. One is from PUT to partner process, i.e., PUT invokes a service provided by a partner process. The other is from partner process to the PUT, i.e., a partner process invokes a service provided by the PUT.

For invocations from PUT to partner processes, mock objects can be used to simulate the invoked services. To this end, in the present invention, the MockObjects (MO) process is used. MockObjects is a test-first development process for building Object-Oriented software and a generic unit testing framework that supports the process, wherein a sequence of expected method invocations together with predefined return values are recorded on an interface/class mock. Using this methodology, the expected request message and the response message can be set in a mock object, which will then be responsible for verifying the actual request message and responding with the predefined response message. A mock implementation of an interface or class acts as a faux implementation that mimics the external behavior of a true implementation, and it also observes how other objects interact with its methods and compares actual behavior with preset expectations. When a discrepancy occurs, a mock implementation will produce a report. In this way, MockObjects tests a unit under test through the collaboration classes of the unit under test.

EasyMock (EM) is a MockObjects implementation, and has both versions for Java and .Net. The code segment listed below demonstrates its basic usage (using the Java version).

```
public class ClassUnderTest {
    public void addListener(Collaborator listener) {
        // ...
    }
    public void addDocument(String title, byte[ ] document) {
        // calls listener.documentAdded(title);
    }
}
public interface Collaborator {
    void documentAdded(String title);
}
-----------------------------------------
package org.easymock.samples;
import junit.framework.TestCase;
import org.easymock.MockControl;
public class ExampleTest extends TestCase {
    private ClassUnderTest classUnderTest;
    private MockControl control;
    private Collaborator mock;
    protected void setUp( ) {
        control = MockControl.createControl(Collaborator.class);   (1)
        mock = (Collaborator) control.getMock( );                  (2)
        classUnderTest = new ClassUnderTest( );
        classUnderTest.addListener(mock);
    }
    public void testAddDocument( ) {
        mock.documentAdded("New Document");                        (3)
        control.replay( );                                         (4)
        classUnderTest.addDocument("New Document",
            new byte[0]); control.verify( );                       (5)
                                                                   (6)
    }
}
```

There are four steps to use the EasyMock process: create, record, replay and verify. Firstly, the mock implementation needs to be created, which contains a MockControl object (1) and a mock object (2) of the target interface/class. The Mock-Control object (1) controls the behavior of its associated mock object (2). Then expected method calls are recorded on the mock object and the possible return values or exceptions are set (3). After activating the mock object using the replays method (4), the MockControl object begins to play back the recorded scenario. Next, the ClassUnderTest (5) is manipulated, assuming that its collaboration class has been implemented. Finally, verifyo method is called to check if there is a discrepancy (6).

On the other hand, for invocations from partner process to the PUT, the matter is different, because the PUT is real and need not be simulated. However, it is still necessary to define the request messages sent to the PUT and the expected response message from the PUT. There are several ways to implement the foregoing. In a preferred embodiment of the present invention, a mock object is used to store the invocation information, but a service proxy needs to be introduced. The requests and expected responses defined in a mock object will be used by the service proxy to invoke PUT services and to verify the actual responses. This will require modification of the normal MockObjects implementation. The advantage is that testers could have a unified view of writing test logic of both invocation directions using mock objects, instead of using mock objects for one direction and using another set of APIs for the other direction.

b) The test logic representation must be able to describe the concurrent behaviors and synchronization constraints in the tested business process. With the use of MockObjects, there are several ways to support the capability. A preferred embodiment of the present invention leverages MockObjects current capabilities and also extends it to describe complex sequencing relationships, as will be explained hereinafter.

Next, in step 205, the test case is executed. Before test execution, the PUT is deployed and an application server is started. Along with and after the execution, the recorded test logic is replayed and verified. Unexpected behaviors are reported to the user. After that, as in any existing test methods, the tester analyzes the test result and deals with it accordingly.

Figure 3:
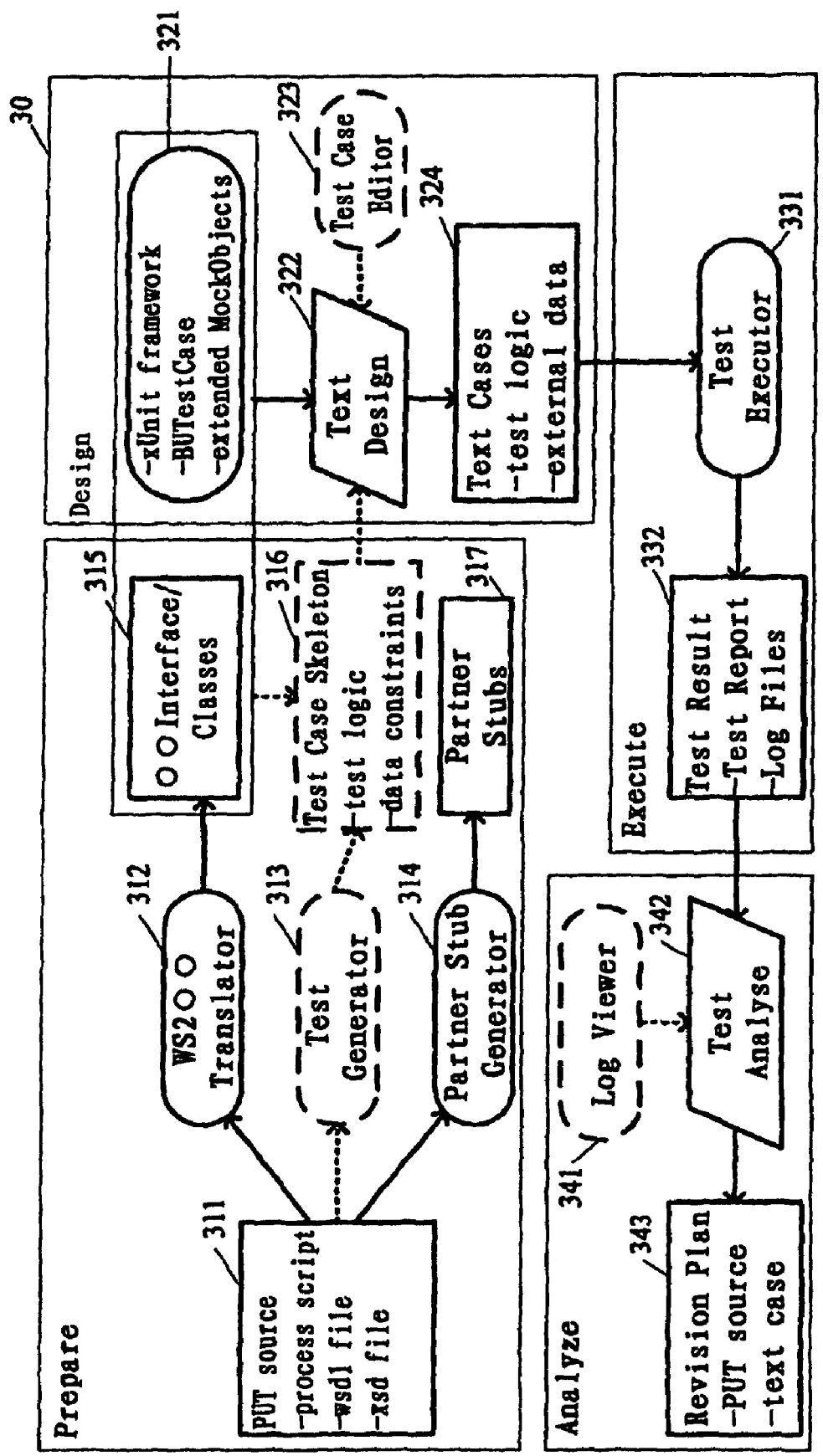
FIG. 3 depicts the architecture of business process unit testing tool according to the present invention.

The business process unit testing method 20 according to the present invention described above in conjunction with FIGS. 1 and 2 can be implemented in various ways in terms of various programming languages, platforms and architectures. FIG. 3 depicts the architecture of business process unit testing tool 30 according to an embodiment of the present invention, and the architecture reflects core functionalities of the unit testing tool 30.

FIG. 3 shows the main components that constitute a unit testing tool together with software artifact flows between these components. In FIG. 3, the rectangular blocks represent the software artifacts, the elliptical blocks represent the components, and the diamond blocks represent the tasks which may involve manual work, and the blocks surrounded by dashed lines represent optional components or software artifacts. As shown in FIG. 3, the components and software artifacts are organized into four groups that correspond to the four basic phases in business process unit testing: prepare, design, execute and analyze. Specifically, in prepare phase, the testing tool 30 includes the components of WS2OO translator 312 and partner stub generator 314, which respectively generate OO interfaces/classes 315 and partner stubs 317 based on the PUT source 311. In a preferred embodiment of the present invention, the testing tool 30 further includes a test generator 313, which takes the PUT process script 311 as input and produces a set of test case skeletons 316 automatically. The test case skeletons 316 contain backbone test logic and required data constraints. The test case skeletons 316 are to be completed in the design phase. In the design phase, users write a set of executable test cases 324 (from scratch or based on the skeletons 316). In doing so, users may leverage some existing unit testing frameworks indicated generally by reference number 321: xUnit (a generic name for JUnit for Java, NUnit for .Net, etc) and MockObjects. Functional extensions are necessary for application of these frameworks 321 to business process testing according to the present invention, as will described hereinafter. In a preferred embodiment of the present invention, the testing tool 30 further includes a test case editor to allow graphical test case authoring. In the execute phase, the testing tool 30 includes a test case executor component 331 which may be a xUnit runner with possible extensions or other components that can execute xUnit test cases. The component 331 executes the test cases 324, and produces test results 332 including test reports and log files. The test results 332 collected in the execute phase are then evaluated in the analyze phase to form a revision plan 343. Optionally, the testing tool 30 includes a log viewer component 341 to visualize the test execution trace.

The tool 30 could be implemented as a plug-in to the IDE for business process development, or as a stand-alone tool that is independent of a business process IDE.

Figure 4:
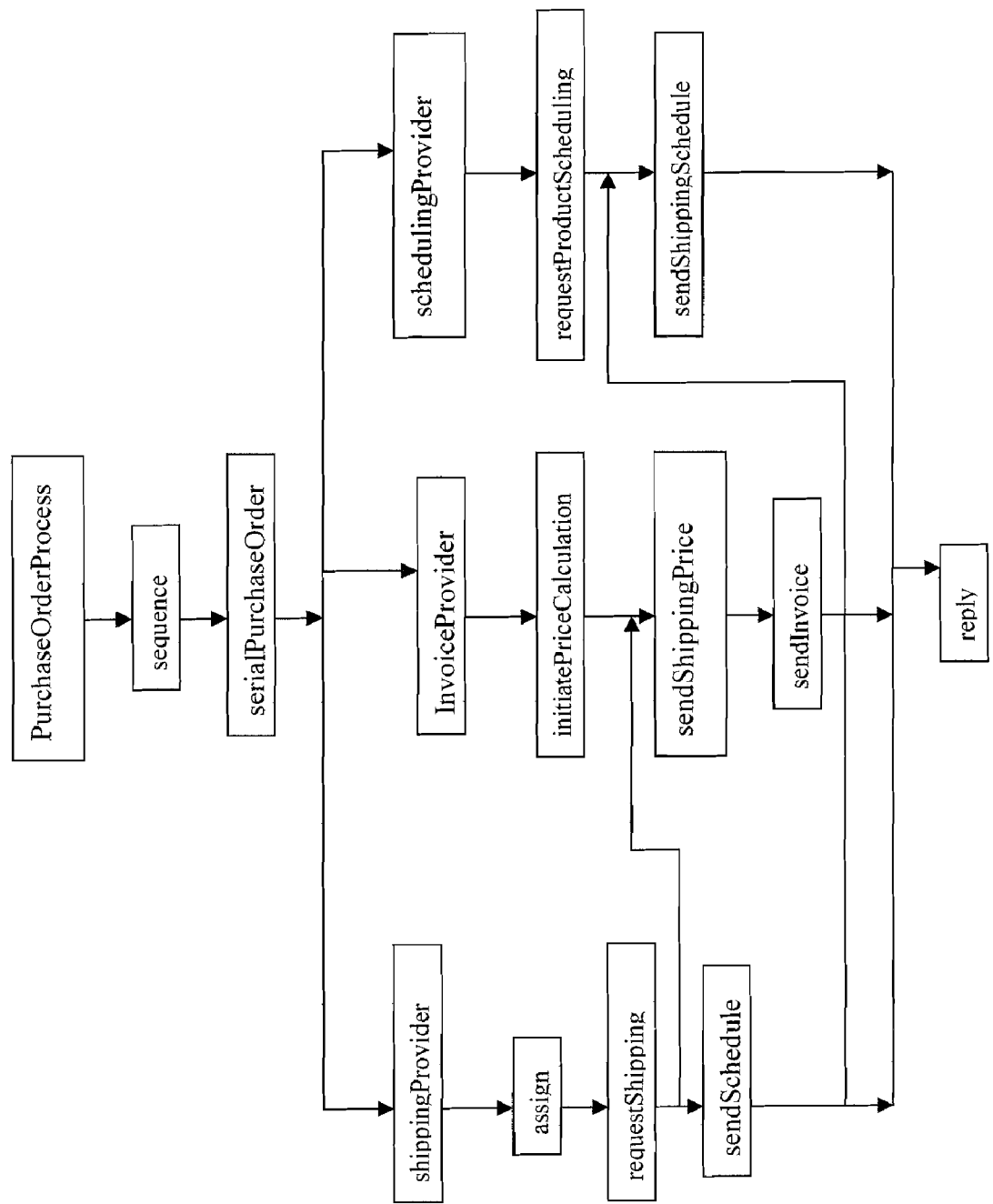
FIG. 4 shows schematically the purchase process as a running example of the present invention.

In order for those skilled in the art to further understand the present invention, the purchase process introduced in the BPEL specification will be explained hereinafter as a running example of the present invention. Its implementation in WSADIE of IBM is shown in FIG. 4. FIG. 4 denotes a graphical form of the process script.

The purchase process runs as follows. On receiving a purchase order from a customer, the Purchase process communicates with three partner processes—Ship, Invoice and Schedule—to carry out the work. It initiates three tasks concurrently: requesting shipment, calculating the price for the order, and scheduling the production and shipment for the order. While some of the processing can proceed concurrently, there are control and data dependencies among the three tasks. In particular, the shipping price is required to finalize the price calculation, and the shipping date is required for the complete fulfillment of schedule. When the three tasks are completed, invoice processing can proceed and the invoice is sent to the customer.

Interfaces offered by the purchase process and its partner processes are defined in WSDL documents as portType. They are visualized in FIG. 5. The purchase process provides three portType: Purchasing, ShippingCallback and InvoiceCallback, each with one operation. Each partner process—Ship, Invoice and Schedule—provides one portType: ShippingService, ComputePriceService and SchedulingService, respectively.

The basic test model according to the present invention will now be described in conjunction with FIGS. 6A and 6B.

The business process under test, a purchase process, interacts with three partner processes—Ship, Invoice and Schedule, which in turn interact with other partners, resulting in a network of processes. FIG. 6A abstracts this composition model. The process under test is abbreviated as PUT, and its partner process is abbreviated as PP. In the viewpoint of an individual process, it does not care how its partners are implemented, because it interacts with each partner through the partner's Web service interface specified in WSDL notation. Thus, a partner may be a simple stateless Web service, or a complex process that choreographs several Web services/processes and exposes one or several Web service interfaces to the caller process. Treating a partner as a generic process makes the method applicable for general cases.

A conversational relationship between two processes is defined in a partner link. Each partner link defines up to two "role" names, and lists the web service interfaces that each role provides to the other in this conversation. In FIG. 6A, arrow lines are used to connect two processes, indicating the service invocations/message flows from the source to the target. For example, arrow line 1 indicates service invocation from partner process PP1 to process under test PUT, and arrow line 4 indicates service invocation from process under test PUT to partner process PP1, and so on.

Figure 6B:
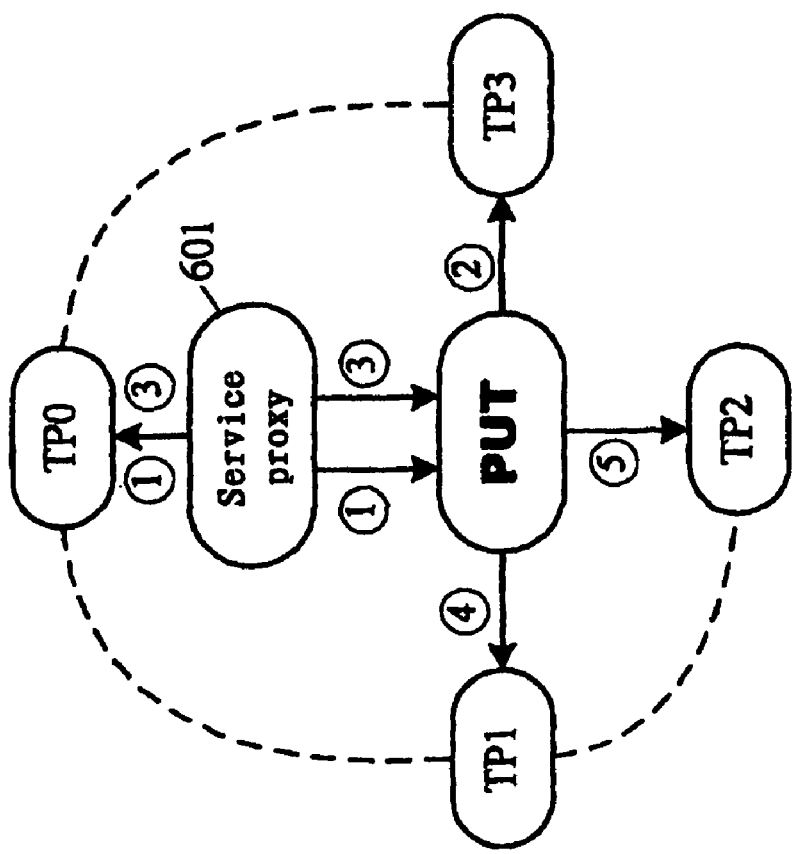
FIG. 6B shows a business process unit testing model according to the present invention for unit testing of the business process shown in FIG. 6A.
Figure 6A:
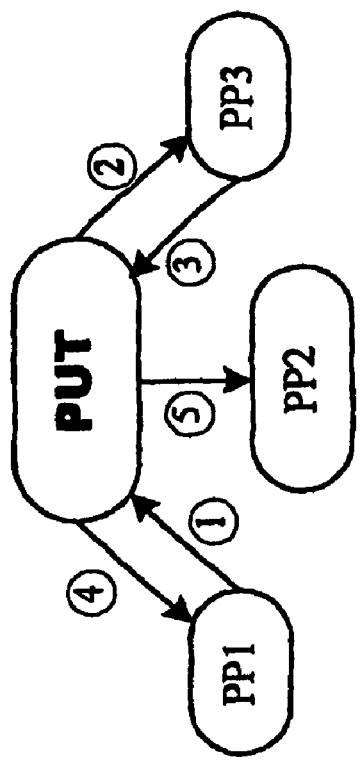
FIG. 6A shows a business process composition model, which illustrates the interaction between the process under test and its partner process in an abstract way.

FIG. 6B shows the unit test model according to the present invention for the process composition model in FIG. 6A. The model uses a Test Process (TPi, i=1,2,3) for each Partner Process (PPi) to simulate its behavior. Actually, TPi only describes one direction of interactions—PUT invoking a PPi service. As for the interaction in the opposite direction—PPi invoking a PUT service, it is accomplished by a service proxy 601 in the unit testing method and tool according to the present invention. PUT service invocations that originally occur in PPi are delegated to the service proxy 601 to execute in testing logic. This is because mock objects can only describe "call-in", but cannot describe "call-out". Therefore, according to the present invention, there is provided a special test process named "TP0", which describes the expected service invocations into the PUT and its expected responses. The requests and responses are used by the service proxy to actually invoke PUT services and verify the actual responses.

Figure 7B:
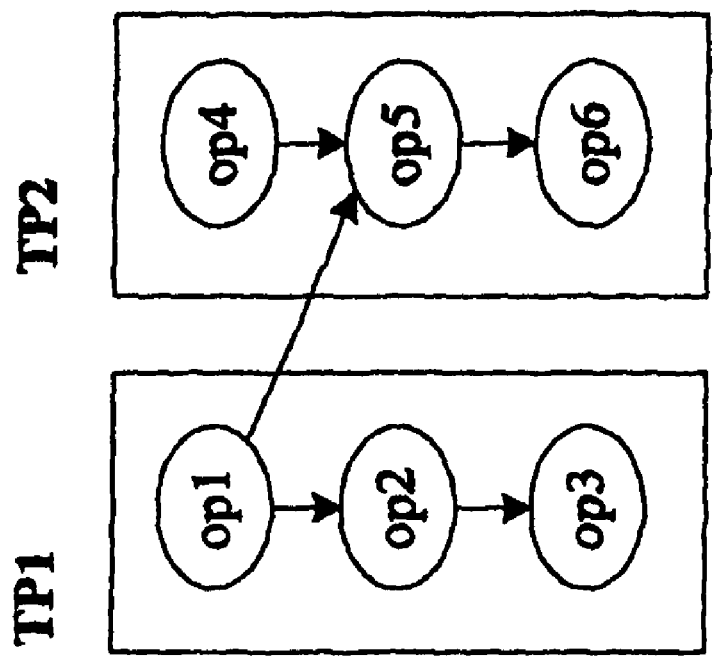
FIG. 7B shows the inter-business process synchronization.
Figure 7A:
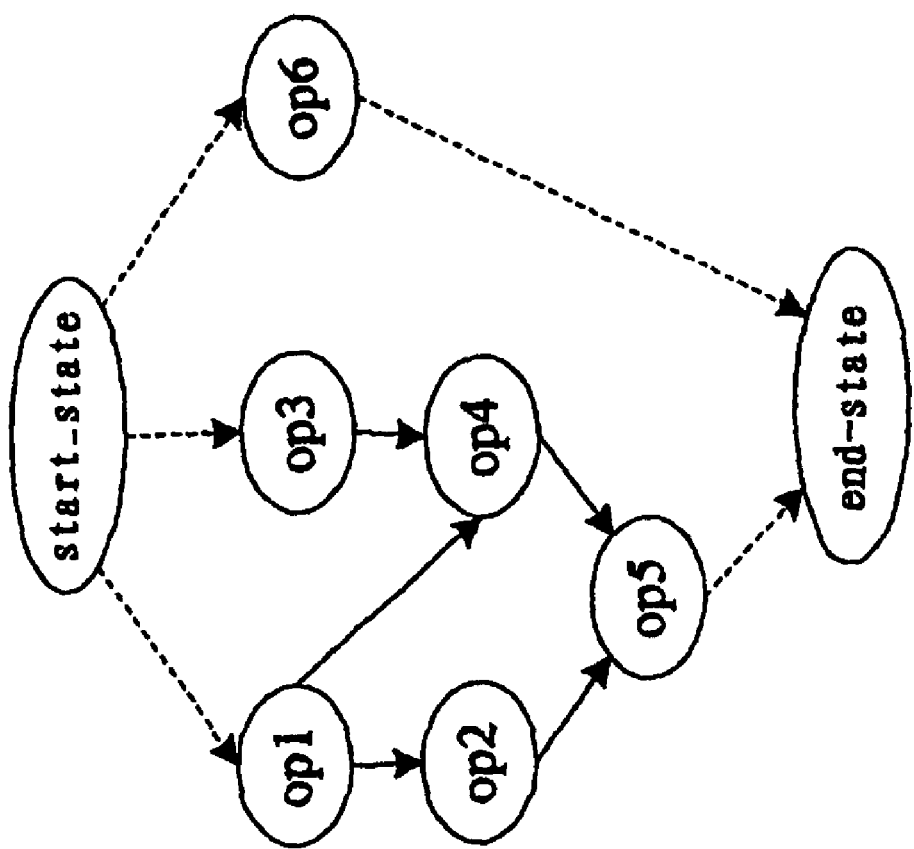
FIG. 7A shows the inner-business process synchronization.

The concurrency and synchronization in the business process unit testing according to the present invention will be explained below in conjunction with FIGS. 7A and 7B.

In normal process behavior and its interaction with other processes, the service invocations follow certain sequencing, which is expressed using programming control structures. BPEL defines the following control structures: sequence, flow, while and switch, among others.

Therefore, in test processes that simulate real processes, similar control structures are needed to express the original activity. In business process unit testing, a piece of test logic should simply describe an execution path of the PUT; complex behaviors like iteration and branching should be avoided as far as possible. However, concurrency and synchronization are common kinds of ordering constraints put on an execution path, so it is unavoidable and must be supported in the test behavior description. In FIG. 6B, the synchronization is denoted by dashed lines. It only shows synchronization dependencies between test processes. Actually, the synchronization can also occur inside a test process. FIG. 7A shows the synchronization inside a test process, wherein op1, op3, op6 are concurrent activities; op1 must be invoked before op4; op5 must be invoked after op2 and op4. FIG. 7B shows synchronization between process TP1 and TP2, wherein op1 must be invoked before op5.

With such synchronization capabilities provided, the service interaction ordering indicated in FIG. 6A is supported in the test logic as shown in FIG. 6B. For example, the logic "firstly a PUT service is invoked, then a TP3 service is invoked" could be supported.

Next, the implementation of the components of the testing tool architecture 300 as shown in FIG. 3 will be detailed.

1. WS2OO Translator

This WS2OO translator component 312 is used to map WSDL to an Object-Oriented language description (e.g. Java, C#). Each web service interface of the involved processes will be mapped to an OO equivalent interface or class; and web service types and messages map to OO data type classes. Here "involved processes" are those revealed in FIG. 6A, including the PUT and its immediate partner processes.

An example implementation of the WS2OO translator, say, WS2Java may be based on two Java specifications: JAX-RPC and JAXB. JAX-RPC specifies how a wsdl:portType element is mapped to a Java interface, which contains Java methods mapped from the wsdl:operation child elements of the corresponding wsdl:portType. The contents of wsdl:input and wsdl:output messages are mapped to Java method parameters or return types, and wsdl:fault messages are mapped to a Java exception. In addition, mapping of XML schema types to Java is described by the JAXB 2.0 specification.

There are several programs available to do WS2OO mapping, including WSDL2Java and WSDL2C, WSDL.exe from Microsoft, and the PocketSOAP suite of utilities. However, those skilled in the art can appreciate that, when implementing a testing tool, it may be necessary to adapt the implementation to a specific BPEL IDE and the MockObjects implementation.

Figure 5:
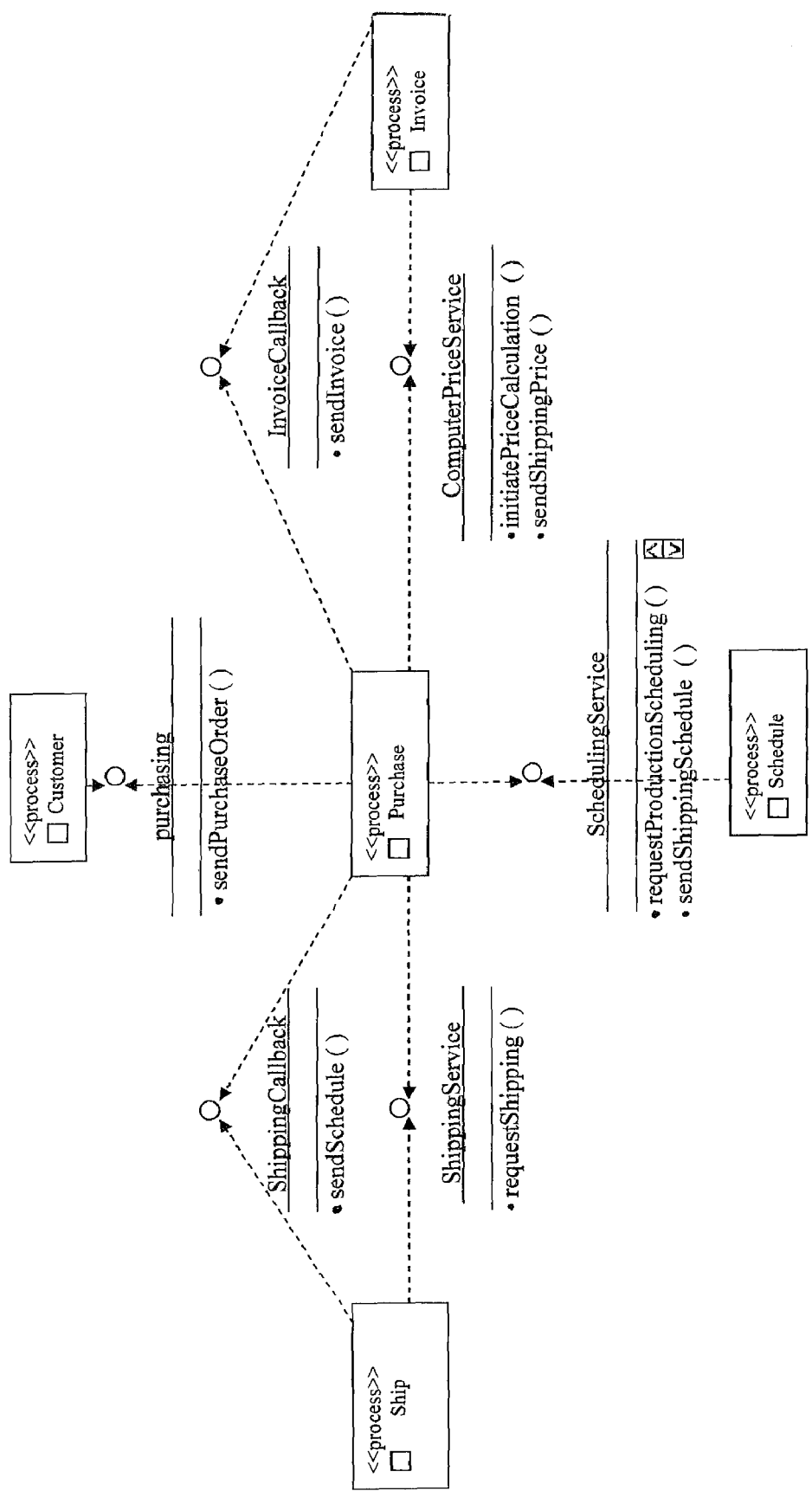
FIG. 5 shows schematically the interfaces provided by the purchase process as a running example of the present invention and its partner processes.

The codes below illustrate the mapping for the Shipping-Service portType of the purchase process as shown in FIG. 5 as a running example of the present invention.

```
<portType name="ShippingService">
    <operation name="requestShipping">
        <input message="wsdl:ShippingRequest"/>
        <output message="wsdl:ShippingInfo"/>
        <fault message="wsdl:ShippingFault" name="fault"/>
    </operation>
</portType>
public interface ShippingService {
    public ShippingInfo requestShipping(ShippingRequest shippingRequest)
throws java.lang.Exception;
}
```

The mapped interface is used for two purposes. One is to generate partner stubs, the other is to generate a mock implementation.

2. Partner Stub Generator

A partner stub is an implementation of a web service interface. At runtime, the web service invocation will be fulfilled by calling the partner stub. This relationship is defined in the wsdl:binding and wsdl:service section. For the purchase process example and the partner stub ShippingServiceStub, the binding and service information is shown in the codes below.

```
<binding name="ShippingServiceJavaBinding" type="ShippingService">
    <java:binding/>
    <format:typeMapping encoding="Java" style="Java">
        ...
    </format:typeMapping>
    <operation name="requestShipping">
        <java:operation methodName="requestShipping"
            parameterOrder="shippingRequest" returnPart="shippingInfo"/>
        <input/>
        <output/>
        <fault name="fault"/>
    </operation>
</binding>
<service name="ShippingServiceJavaService">
    <port binding="ShippingServiceJavaBinding"
        name="ShippingServiceJavaPort">
        <java:address className="ShippingServiceStub"/>
    </port>
</service>
```

The highlighted java:address element specifies that ShippingServiceStub is the service endpoint. Note that this binding and service information should replace the original one in deploying the process under test to test it.

A partner stub does not really implement the service logic; instead, it relays the invocation to a mock object of the same web service interface, and then passes the return value to the original caller, as the highlighted statements show. Put in simple terms, what the process under test really calls at runtime is the mock implementation. To hide this complexity, the partner stub could be automatically generated and hidden from the user.

3. EasyMock Usage and Extension

Mock create, record and verify: The mapped OO interface/class is used to create a mock implementation (a mock control and a mock object). Then in a test case, on each mock object, a sequence of method calls are recorded which are expected to be received by the corresponding partner process from the PUT, and the return values are prescribed. If the PUT makes a wrong invocation during running (including a method call with wrong parameters, wrong call numbers or sequencing), the verification mechanism of MockObjects will report the error.

Each portType (defining a web service interface) of the PUT or a partner process has a mock implementation. Therefore, a process may correspond to several mock objects, one for each portType. For the purchase process example, there will be six mock objects: three for the PUT (Purchasing, InvoiceCallback and ShippingCallback), one for each partner process—ShippingService, ComputePriceService and SchedulingService.

The difference between PUT and partner process: A mock object for a process sets the expected invocations on the process as well as the possible return value, and verifies at runtime that the expected invocations occur with the correct parameters. For example, assume that mockShip is the mock object of ShippingService, mockShip.requestShipping (shipRequest) is used to set the expectation of the invocation of requestShipping with a parameter (shipRequest), and setReturnValue("ShippingService", shipInfo) is used to set the return value (shipInfo) of the invocation. Therefore, here a mock object is used to simulate the services provided by a non-existent partner process—what time a service is requested, and the response. The mock objects for partner processes will be called by the PUT at run time via the relay of partner stubs.

However, the mock object for the PUT is handled differently. A mock object for the existing PUT is used NOT to simulate its behavior, but to tell the service proxy to make an invocation to the PUT and then check if the possible return value of the invocation is correct. In the example of the purchase process, for example, mockPurchasing is the mock object of the PUT Purchasing interface. The first statement below tells the service proxy that it should invoke the sendPurchaseOrder operation with the specified parameters, and the second statement tells the service proxy to check that the PUT should return invoice as the response.

mockPurchasing.sendPurchaseOrder(po, customerInfo);
      setReturnValue("Purchasing" invoice);

The service proxy performs the steps on behalf of the relevant partner process which makes the invocation in real run, because the MockObject framework does not allow specifying outgoing call behavior in a mock object. The service proxy also invokes the mock object when it invokes the PUT. This is a unified way of expressing test logic, allowing all the interactions to be verified by the MockObjects built-in verification function, whether it is from the PUT to a partner process or reverse. In order to avoid confusion on the semantics of mock objects, according to a preferred embodiment of the present invention, the PUT is also treated as a nonexistent process in writing test cases.

Modification of mock object: To enable the differentiation of these two types of mock objects, a tool implementation must use a method to identify the mock objects of the PUT services from that of partner processes, for example, by using a configuration file. Modification of the MockObjects implementation is necessary to inform the service proxy about the special mock objects and the associated method invocations.

Implement the service proxy: The interface between the service proxy and the PUT can be varied. In a preferred embodiment, the BPEL engine APIs provided by the application server are used to call the PUT services.

Test behavior support: MockObjects may provide some flexible behavior description and verification mechanism. For example, EasyMock has three types of MockControl. The normal one will not check the order of expected method calls. Another strict one will check the order of expected method calls. For these two types, an unexpected method call on the mock object will lead to an AssertionFailedError. The remaining nice one is a more loose version of the normal one, it will not check the order of expected method calls, and an unexpected method call will return an empty value (0, null, false).

Concurrency: These preset and special MockControl types could be used to express two basic types of control logic/method call ordering: sequence and random (unordered). Take the purchase process as an example. To ensure that several service invocations from the PUT to another process occur in the right sequential order as specified, the strict MockControl could be used to create the mock implementation of that process. Besides sequence and random, there is generic control logic such as alternative (switch), timer operations (start timer, timeout), and concurrency that probably have not been supported by existing MockObjects implementations. Ideally, the testing of business processes needs the MockObjects implementation to support generic control logic. A possible MockObject implementation could use UML activity or state-machine (possibly with simplification and extension) as the behavior model of mock objects. Practically, the MockObjects implementation should support the concurrency and synchronization logic. For this purpose, extension to the current MockObjects implementation may be necessary. According to a preferred embodiment of the present invention, an extension allows testers to specify a successive relation on several methods, say, by an API syncMethods(m1, m2, . . . ) that specifies the occurrence order of the methods m1, m2, etc.

Then for inner-process concurrency and synchronization shown in FIG. 7A, the logic could be expressed as follows: use normal MockControl to create the mock implementation so that the method calls will be unordered, then the ordering constraints are designated by using syncMethods( ) API like this:

syncMethods(op1, op2, op5);
    syncMethods(op3, op4, op5);
    syncMethods(op1, op4);

For inter-process concurrency and synchronization shown in FIG. 7B, the logic could be expressed as follows: use strict MockControl to create the mock implementations for TP1 and TP2 so that the method calls on each mock object will be checked for their correct ordering, e.g., op1 before op2 before op3, then use syncMethods(op1, op5) to designate the synchronization between TP1 and TP2. Note that different mock objects are independently invoked at run time so their behaviors are purely concurrent unless explicit synchronization is placed therebetween.

An alternative usage of the MockObjects is to use a single mock implementation for all the partner processes, and a single one for the PUT. This is feasible if the MockObjects implementation supports the simulation of multiple interfaces/classes in one mock implementation. Specially, EasyMock could be easily extended (modify CreateControl( ) API to accept an array of interfaces) for this purpose. An advantage of such MockObjects usage is that there will be fewer mock implementations to manage and manipulate in a test case.

4. Test Generator

In the present invention, the test generator is an optional component that provides an advanced function—test case generation from the business process script. This function is desirable because manual test case design is time-consuming, since the user needs to manually examine the process to identify different execution scenarios, and write test logic to express the scenarios. Test generation is expected to automatically find the execution scenarios and generate the corresponding test logic, thus saving a lot of test design time while improving the test completeness at the same time. Those skilled in the art will appreciate that test generation may be partly automated and acts as an assistant tool. For example, the test generator could be used to generate test case skeletons, which will be reviewed and refined by the tester in terms of both control logic and data values.

5. Test Case Editor

This component is used to provide a visual edit support to ease test case design. Possible edit styles include sequence diagram and activity diagram of the standard UML notation (with possible simplification and extension). Testers draw diagrams, which are then translated into test code in the selected OO programming language.

Compared with OO programming code, the graphical edit has advantages such as being intuitive and easy to learn, and is especially useful for business process programmers that are unfamiliar with the OO programming language. In this way, the OO test code can be hidden from the business process programmers.

6. Test Executor

Figure 8:
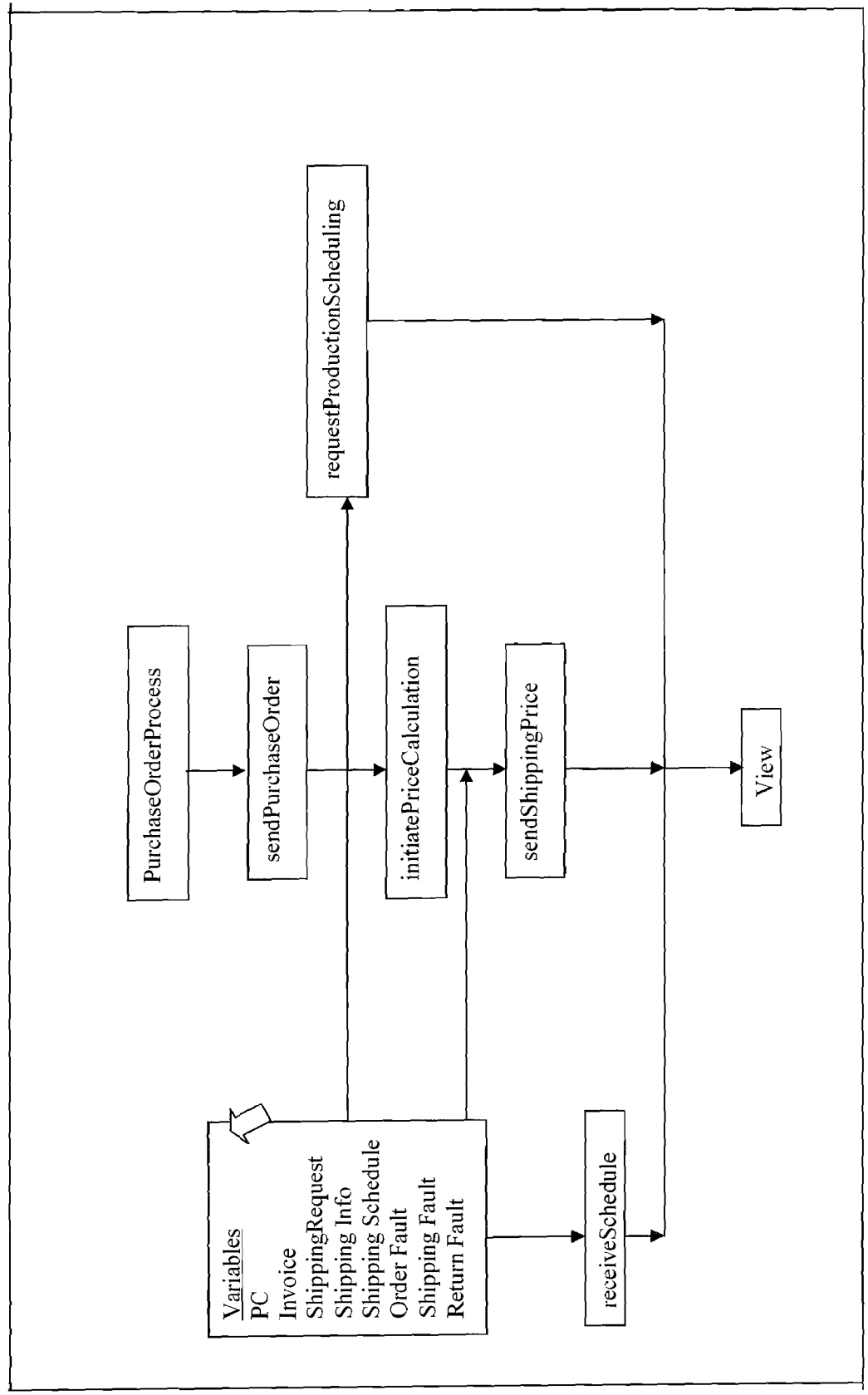
FIG. 8 shows a screenshot of running a business process test case in JUnit test runner.

Business process unit test cases can be run by the xUnit runner. For example, JUnit provides both text and graphical runners. FIG. 8 shows a screenshot of running a BPEL test case in JUnit test runner.

7. Log Viewer

Test results are collected in test report and log files after the test execution. A test report could be in the form of an xUnit "Failures" report, and log files could be the log file of the application server that runs the PUT or the log file of the testing tool. From this information, an event trace can be reconstructed, and the failure cause may be located in the PUT code. The event trace could be visualized in a sequence diagram by the log viewer. This will help testers in navigating the interaction details and identifying failure points. Based on the test analyses, a revision plan for PUT code or/and the test case can be derived.

Those skilled in the art will appreciate that the various components in the testing tool according to the present invention described above can be implemented with software, hardware, firmware and the combination thereof.

In addition, the unit testing method according to the present invention can be realized as a computer program on a recording media. These media include, but are not limited to, optical disc, magnetic disc, and semiconductor memory.

The method and tool for unit testing of automatic business processes in business process programming languages of the present invention have been described in light of preferred embodiments. Those skilled in the art will appreciate that, these embodiments are provided for purposes of illustration rather than limitation to the present invention. Various modifications can be made to these embodiments without departing the spirit and scope of the present invention as set forth in the appended claims.

The invention claimed is:

1. A method for unit testing of business processes for Web services, comprising the steps of:
    mapping Web service description language (WSDL) elements of a process under test and its partner processes into equivalent Object-Oriented language (OO) elements;
    forming test cases containing test logic which describes service invocations between the process under test and its partner processes, wherein mock objects of the OO interfaces of the partner processes are used to simulate services of the partner processes; and
    executing test cases, wherein each of said partner stubs and its associated mock objects collectively implement the service of a corresponding partner process.

2. The method of claim 1, wherein said WSDL binding is a binding of said Object-Oriented language used in said mapping step.

3. The method of claim 1 wherein said WSDL binding is a Simple Object Access Protocol (SOAP) binding.

4. The method of claim 1, wherein, in said step of forming a test case, the service invocation from the partner process to the process under test is implemented by a service proxy invoking a mock object of the process under test.

5. The method of claim 1, wherein said test logic supports concurrency and synchronization in said business processes.

6. The method of claim 1, wherein said step of forming a test case includes:
    generating a skeleton of said test case automatically; and
    completing the test case based on said skeleton.

7. The method of claim 1, wherein said step of forming test cases is performed graphically.

8. The method of claim 1, wherein,
    said business processes for Web services include business processes specified in the following programming languages: BPEL4WS, BPMN, WfXML, XPDL, XLANG and WSFL; and
    said Object-Oriented languages include Java and C#.

9. An apparatus for unit testing of business processes for Web services comprising:
    a processor coupled to a random access memory for executing sections;
    a section for mapping Web service description language (WSDL) elements of a process under test and its partner processes into equivalent Object-Oriented language (OO) elements;
    a test case forming section for a forming test cases containing test logic which describes service invocations between the process under test and its partner processes, wherein mock objects of the OO interfaces of the partner processes are used to simulate services of the partner processes; and
    a test case executing section for executing test cases, wherein each of said partner stubs and its associated mock objects collectively implement the service of a corresponding partner process.

10. The apparatus of claim 9, wherein, said test case forming section comprises a service proxy for implementing a service invocation from the partner process to the process under test by invoking the mock object of the process under test.

11. The apparatus of claim 9, wherein said test logic supports the concurrency and synchronization in said business processes.

12. The apparatus of claim 9, wherein said test case forming section additionally comprises a test case generator for generating a skeleton of said test case automatically, and said test case is completed based on said skeleton.

13. The apparatus of claim 9, wherein said test case forming section additionally comprises a test case editor for forming the test case graphically.

14. A computer program product including program codes for a processor coupled to a random access memory to perform a method for unit testing of business processes for Web services, wherein said method comprises the steps of:
   mapping Web service description language (WSDL) elements of a process under test and its partner processes into equivalent Object-Oriented language (OO) elements;
   forming test cases containing test logic which describes service invocations between the process under test and its partner processes, wherein mock objects of the OO interfaces of the partner processes are used to simulate services of the partner processes; and
   executing test cases, wherein each of said partner stubs and its associated mock objects collectively implement the service of a corresponding partner process.

15. A non-transitory computer-readable storage medium recording thereon computer program codes which, when being executed, cause the computer to perform a method for unit testing of business processes for Web services, said method comprising the steps of:
   mapping Web service description language (WSDL) elements of a process under test and its partner processes into equivalent Object-Oriented language (OO) elements;
   forming test cases containing test logic which describes service invocations between the process under test and its partner processes, wherein mock objects of the OO interfaces of the partner processes are used to simulate services of the partner processes; and
   executing test cases, wherein each of said partner stubs and its associated mock objects collectively implement the service of a corresponding partner process.

* * * * *